F. LOBNITZ.
HOPPER DREDGER AND BARGE.
APPLICATION FILED JULY 23, 1909.
946,059.
Patented Jan. 11, 1910.
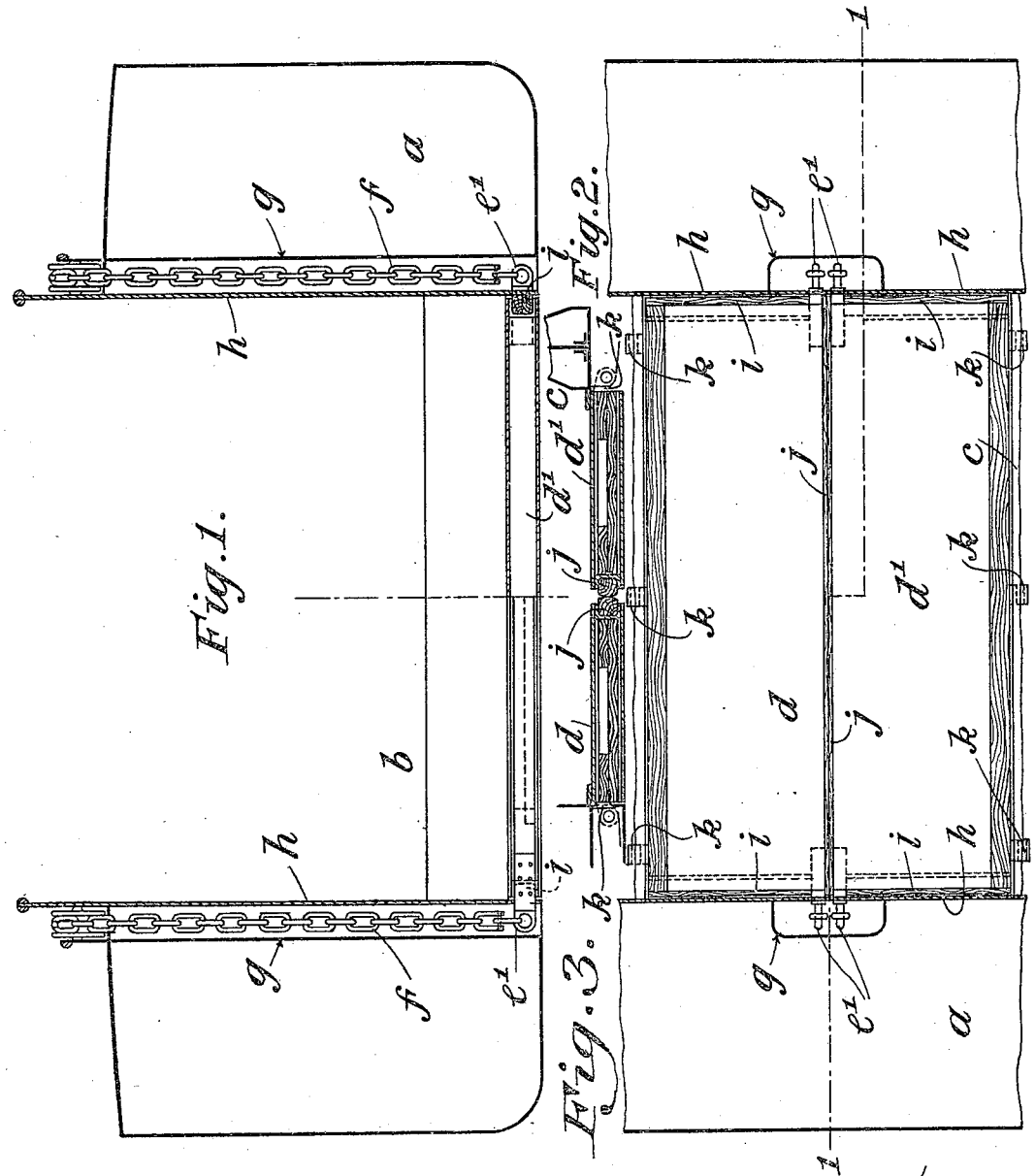

UNITED STATES PATENT OFFICE.

FRED LOBNITZ, OF CROOKSTON, SCOTLAND.

HOPPER DREDGER AND BARGE.

946,059.     Specification of Letters Patent.     Patented Jan. 11, 1910.

Application filed July 23, 1909. Serial No. 509,187.

*To all whom it may concern:*

Be it known that I, FRED LOBNITZ, a subject of the King of Great Britain, residing at Ross Hall, Crookston, county of Renfrew, Scotland, have invented certain new and useful Improvements in Hopper Dredgers and Barges, of which the following is a specification.

This invention relates to hopper dredgers and barges of the class having transverse hopper doors opening downward.

Under my invention the hopper has side walls which extend straight down at the bottom thereof and the hopper doors close tight against said side walls being manipulated by the usual raising and lowering means, such as chains or equivalent which work in trunks, means being provided for attaching the chains or equivalent to the doors.

In order that my invention may be clearly understood I have hereunto appended an explanatory sheet of drawings, whereon:—

Figure 1 is a view of a hopper barge taken on the section line 1, 1, Fig. 3. Fig. 2 is a section showing two of the transverse hopper doors in the closed position. Fig. 3 is a sectional plan of a portion of a hopper barge and showing the two hopper doors closed.

$a$ is the hopper barge, $b$ the hopper thereof, $c$ girders extending across the hopper from side to side and to which the doors are hinged as usual, and $d$, $d^1$, two of the transverse hopper doors.

In carrying out the invention each transverse hopper door $d$, which is hinged in the usual manner, is provided with means, such as outwardly extending lugs $e^1$, $e^1$, one at each side thereof, to which the raising and lowering chains $f$ are attached, said chains being manipulated in the usual manner. The chains work in trunks $g$, $g$, arranged opposite one another and, as will be seen, the hopper plating $h$ extends straight down without a break or recess or projection to the bottom of the hopper and the hopper doors are arranged so that their sides, when the doors are raised, close tightly against the said plating $h$. In order to insure that the doors shall close tight they are each provided, at the sides thereof, with hard wood or other packing $i$, as shown clearly and distinctly at Figs. 1 and 3, the said wood packing rubbing against the straight side walls of the hopper and making a tight joint therewith. The doors are provided with hard wood facings at $j$ Figs. 2 and 3 so as to close tightly against one another.

As will be seen, in the arrangement shown on the drawings, the door $d$ is hinged to the one cross girder $c$ while the door $d^1$ is hinged to the other cross girder $c$.

In the arrangement shown the trunks $g$, $g$, are built outside the plating $h$ so as not to form an obstruction in the hopper and the lugs $e$ are extended into said trunks so as to enable the doors to be readily manipulated by means of the usual chains $f$ which work in the trunks.

By making the hopper with straight sides and with the doors working against said sides and forming joints therewith the construction of the hopper is much simplified and cheapened and as there are no projections or other obstructions in the hopper apart from the usual cross girders, a free discharge is given for rocks, stones, etc.

The sides of the hopper above the doors can of course be inclined if so desired.

Having now fully described my invention what I claim and desire to secure by Letters Patent is:—

1. A hopper barge or dredger having, in combination, a hopper with sides which extend straight down at the bottom thereof, transverse hopper doors adapted to close tightly against said straight sides, lugs on the sides of the hopper doors at the closing edges thereof and adapted to pass through the side of the hopper, and means external of the hopper for operating said doors.

2. A hopper barge or dredger having, in combination, a hopper with sides which extend straight down at the bottom thereof, transverse hopper doors adapted to close tightly against said straight sides, lugs on the sides of the hopper doors at the closing edges thereof and adapted to pass through the side of the hopper, chains connected to the lugs for raising and lowering the doors and trunks external of the hopper into which the said lugs extend and in which the said chains work.

In testimony whereof I affix my signature in presence of two witnesses.

FRED LOBNITZ.

Witnesses:
   JAMES R. WOOD,
   JAMES TYRE.